US011428306B2

(12) United States Patent
Steinberger et al.

(10) Patent No.: US 11,428,306 B2
(45) Date of Patent: Aug. 30, 2022

(54) HYBRID MODULE SHIPPING STRAP

(71) Applicant: Schaeffler Technologies AG & Co. KG, Herzogenaurach (DE)

(72) Inventors: Markus Steinberger, Sagamore Hills, OH (US); John Ramsey, Mansfield, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/891,599

(22) Filed: Jun. 3, 2020

(65) Prior Publication Data

US 2020/0393036 A1 Dec. 17, 2020

Related U.S. Application Data

(60) Provisional application No. 62/860,076, filed on Jun. 11, 2019.

(51) Int. Cl.
*F16H 57/02* (2012.01)
*F16H 57/00* (2012.01)

(52) U.S. Cl.
CPC ..... *F16H 57/02* (2013.01); *F16H 2057/0093* (2013.01); *F16H 2057/02026* (2013.01);
(Continued)

(58) Field of Classification Search
CPC .......... F16H 57/00; F16H 57/02; F16H 57/03; F16H 57/031; F16H 2057/0093;
(Continued)

(56) References Cited

U.S. PATENT DOCUMENTS 7,597,405 B2 10/2009 Langer et al.
7,944,079 B1 * 5/2011 Signore .................. F03D 80/50
290/55
(Continued)

FOREIGN PATENT DOCUMENTS

CN 203071775 U 7/2013
CN 104964024 A 10/2015
(Continued)

OTHER PUBLICATIONS

Define annular—Google Search, Aug. 6, 2021 (Year: 2021).*
Annular—Merriam Webster Dictionary, Aug. 6, 2021 (Year: 2021).*

*Primary Examiner* — Vinh Luong

(57) ABSTRACT

A shipping strap for a hybrid module includes a first annular surface, a second annular surface, and a central bore. The first annular surface includes a first orifice for receiving a first fastener for fixing the shipping strap to a hybrid module housing, or receiving a dowel pin for radially positioning the shipping strap relative to the hybrid module housing. The second annular surface includes a second orifice for receiving a second fastener for securing the shipping strap to a rotor for an electric machine to axially position the rotor in the hybrid module housing. In some example embodiments, the shipping strap has a through bore aligned with the central bore, and a lifting element installed in the through bore for installing the hybrid module in a multi-speed transmission. In an example embodiment, the lifting element is installed in the through bore by a threaded connection.

14 Claims, 5 Drawing Sheets

(52) U.S. Cl.
CPC .............. *F16H 2057/02034* (2013.01); *F16H 2057/02043* (2013.01)

(58) Field of Classification Search
CPC . F16H 2057/02043; F16H 2057/02034; F16H 2057/02026; F16H 2057/02047; B60K 6/38; B60K 6/405
See application file for complete search history.

(56) References Cited

U.S. PATENT DOCUMENTS

| | | | | |
|---|---|---|---|---|
| 8,057,140 | B2 * | 11/2011 | Entwistle | B64F 5/50 410/47 |
| 10,125,677 | B1 * | 11/2018 | Sherry | F02B 63/044 |
| 10,934,931 | B2 * | 3/2021 | Goleczka | H02K 19/16 |
| 2003/0155822 | A1 | 8/2003 | Nadeau et al. | |
| 2008/0072586 | A1 * | 3/2008 | Hammond | B60K 6/405 60/330 |
| 2013/0256084 | A1 * | 10/2013 | Steinberger | F16D 7/044 192/70.27 |
| 2016/0252170 | A1 | 9/2016 | Lindemann et al. | |
| 2017/0023171 | A1 * | 1/2017 | Khan | B65D 85/68 |
| 2019/0031012 | A1 * | 1/2019 | Bird | B60K 6/383 |
| 2019/0084401 | A1 | 3/2019 | Moasherziad et al. | |

FOREIGN PATENT DOCUMENTS

| | | | | |
|---|---|---|---|---|
| CN | 205666693 U | | 10/2016 | |
| DE | 102008009573 A1 | * | 8/2009 | ............. F16H 57/03 |
| EP | 3199836 B1 | * | 9/2021 | ............. F16H 57/025 |
| FR | 2890035 A1 | * | 2/2007 | ............. F16H 57/02 |
| WO | WO 2014111106 A1 | * | 7/2014 | ............. F16H 57/031 |
| WO | WO 2018153548 | * | 8/2018 | ............. F16H 57/02 |
| WO | WO 2020251879 A1 | * | 12/2020 | ............. F16H 57/02 |
| WO | WO 2021004689 A1 | * | 1/2021 | ............. F16H 57/023 |

\* cited by examiner

HYBRID MODULE SHIPPING STRAP

TECHNICAL FIELD

The present disclosure relates generally to a hybrid module, and more specifically to a shipping strap for a hybrid module.

BACKGROUND

A shipping dome for a hybrid module is known from commonly-assigned United States Patent Application Publication No. 2019/0084401, hereby incorporated by reference as if set forth fully herein. Face splines are known from commonly-assigned United States Patent Application Publication No. 2016/0252170 and commonly-assigned U.S. Pat. No. 7,597,405, both incorporated by reference as if set forth fully herein.

SUMMARY

Example aspects broadly comprise a shipping strap for a hybrid module including a first annular surface, a second annular surface, and a central bore. The first annular surface includes a first orifice for receiving a first fastener for fixing the shipping strap to a hybrid module housing, or receiving a dowel pin for radially positioning the shipping strap relative to the hybrid module housing. The second annular surface is radially inside of the first annular surface and axially offset from the first annular surface. The second annular surface includes a second orifice for receiving a second fastener for securing the shipping strap to a rotor for an electric machine to axially position the rotor in the hybrid module housing. The central bore is arranged for receiving a pilot of the rotor for radially positioning the rotor in the hybrid module housing. In some example embodiments, the shipping strap has a through bore aligned with the central bore, and a lifting element installed in the through bore for installing the hybrid module in a multi-speed transmission. In an example embodiment, the lifting element is installed in the through bore by a threaded connection.

In an example embodiment, a hybrid module includes the shipping strap and the hybrid module housing. The first fastener is a bolt and the shipping strap is fixed to the hybrid module housing by the bolt installed in the first orifice and threaded into the hybrid module housing. In an example embodiment, a hybrid module includes the shipping strap and the hybrid module housing. The shipping strap is radially positioned relative to the hybrid module housing by the dowel pin installed in the first orifice. In some example embodiments, the shipping strap includes a third orifice in the first annular surface for receiving a dowel pin for radially positioning the shipping strap relative to the hybrid module housing. The first orifice is for receiving the first fastener for fixing the shipping strap to the hybrid module housing.

In an example embodiment, a hybrid module includes the shipping strap and the hybrid module housing. The first fastener is a bolt, the shipping strap is fixed to the hybrid module housing by the bolt installed in the first orifice and threaded into the hybrid module housing, and the shipping strap is radially positioned relative to the hybrid module housing by the dowel pin installed in the third orifice. In some example embodiments, a hybrid module includes the shipping strap, the hybrid module housing, the second fastener, and the rotor for the electric machine axially positioned in the hybrid module housing and secured to the shipping strap by the second fastener. In an example embodiment, the hybrid module includes a nut. The second fastener is a stud fixed to the rotor, and the nut is installed on the stud to secure the rotor to the shipping strap. In an example embodiment, a hybrid module includes the shipping strap, the hybrid module housing, and the rotor for the electric machine having a pilot installed in the central bore to radially position the rotor in the hybrid module housing.

Other example aspects broadly comprise a hybrid module including a hybrid module housing, a rotor for an electric machine, and a shipping strap. The rotor has a pilot and the shipping strap has a first annular surface with a first orifice, a second annular surface, radially inside of the first annular surface and axially offset from the first annular surface, and having a second orifice and a central bore. The shipping strap is secured to the hybrid module by a first fastener installed in the first orifice, the shipping strap is secured to the rotor by a second fastener installed in the second orifice, and the rotor is radially positioned in the hybrid module housing by the pilot installed in the central bore. In an example embodiment, the rotor is axially positioned in the hybrid module housing by the shipping strap. In an example embodiment, the hybrid module includes a torque converter fixed to the rotor, and a shipping dome fixed to the hybrid module housing for radially and axially positioning the torque converter relative to the hybrid module housing.

Other example aspects broadly comprise a method of installing a hybrid module including: providing a hybrid module with a hybrid module housing and a rotor; providing a shipping strap; securing the shipping strap to the hybrid module housing and to the rotor; transporting the hybrid module to a transmission assembly facility; installing the hybrid module with a transmission; transporting the transmission to a vehicle assembly facility; removing the shipping strap; and, installing the transmission in a vehicle. In an example embodiment, the shipping strap includes a lifting element for aiding the step of installing the hybrid module with a transmission. In an example embodiment, the hybrid module has a torque converter fixed to the rotor, and the method includes securing a shipping dome to the hybrid module housing before the step of transporting the hybrid module to a transmission assembly facility, and removing the shipping dome before the step of installing the hybrid module with a transmission.

Other example aspects broadly comprise a hybrid module including a housing, an electric machine installed in the housing and including a rotor, a drive plate for fixing to an engine flexplate, and a fastener. The drive plate is fixed to the rotor by a face spline connection secured by the fastener. In an example embodiment, the rotor has a rotor carrier with a first face spline, and the drive plate has a second face spline, complementary to and in contract with the first face spline. In an example embodiment, the first face spline and the second face spline comprise respective apertures and the fastener is installed in the apertures to axially retain the drive plate to the rotor carrier.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. It should be noted that no material should be inferred by the style of hatch lines shown in the figures. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
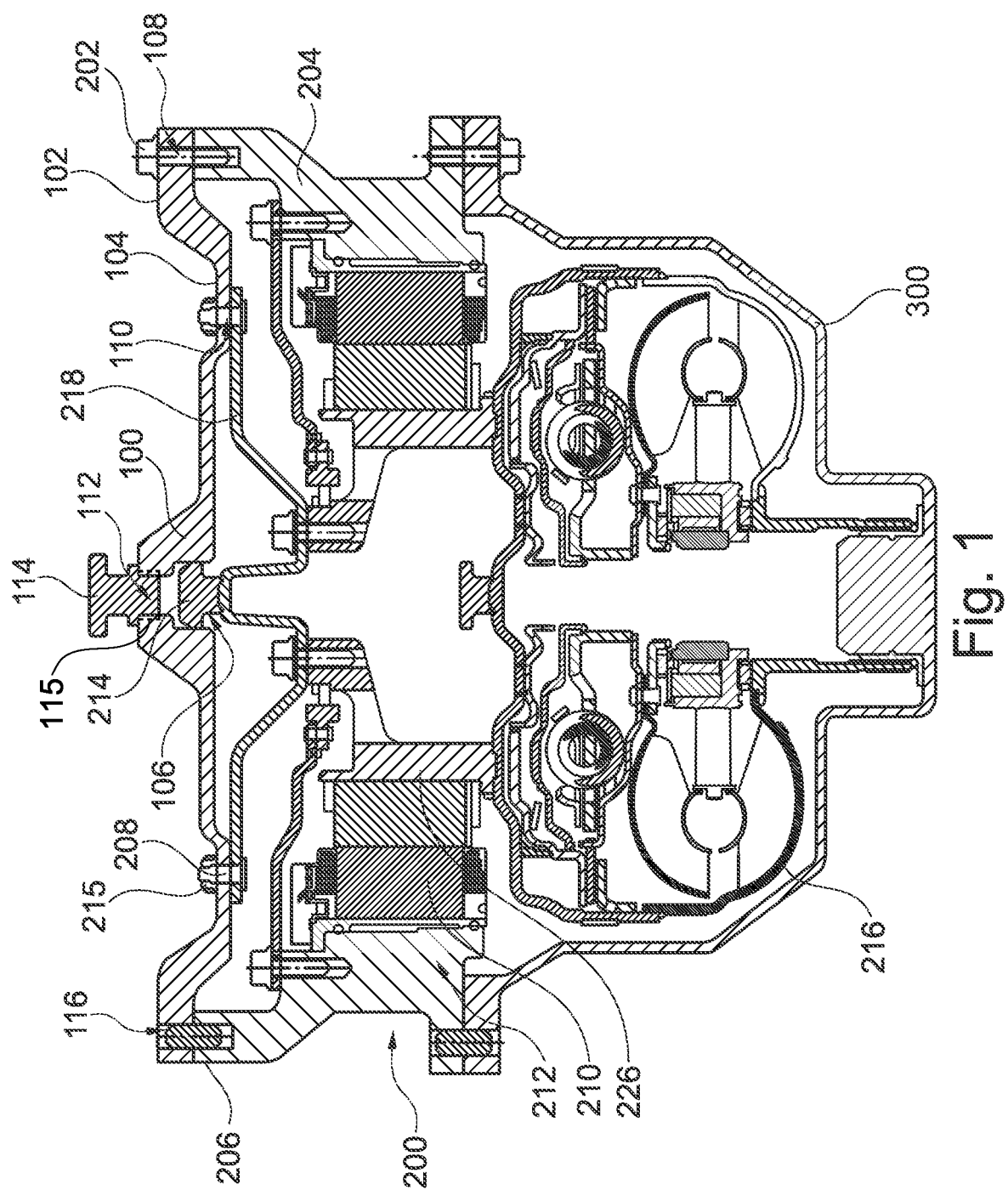
FIG. 1 illustrates a cross-sectional view of a hybrid module assembled with a shipping strap and a shipping dome taken generally along line 1-1 in FIG. 2.
Figure 2:
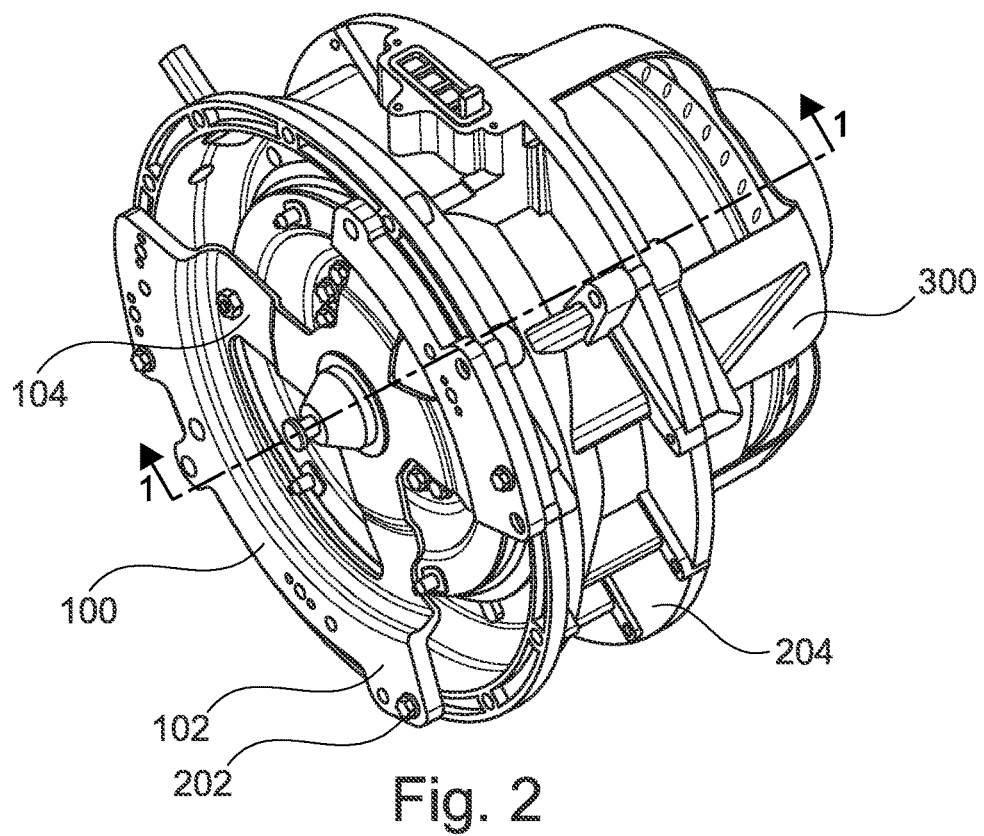
FIG. 2 illustrates a perspective view of the hybrid module of FIG. 1 showing the shipping strap.
Figure 3:
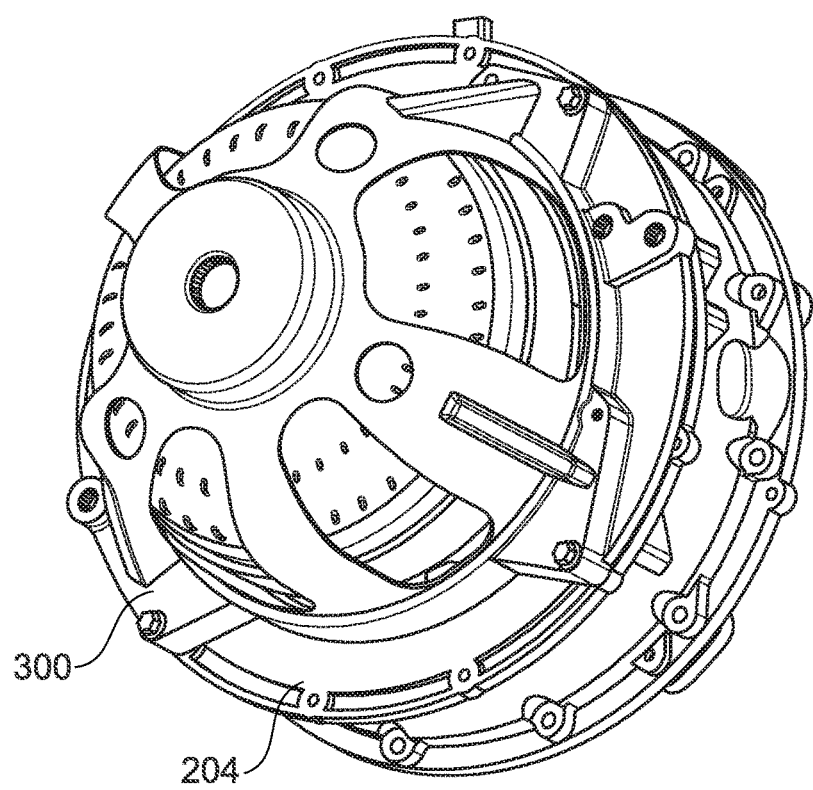
FIG. 3 illustrates a perspective view of the hybrid module of FIG. 1 showing the shipping dome.

The following description is made with reference to FIGS. 1-3. FIG. 1 illustrates a cross-sectional view of a hybrid module assembled with a shipping strap and a shipping dome. FIG. 2 illustrates a perspective view of the hybrid module of FIG. 1 showing the shipping strap. FIG. 3 illustrates a perspective view of the hybrid module of FIG. 1 showing the shipping dome. Shipping strap 100 for hybrid module 200 includes annular surface 102, annular surface 104, and central bore 106. Annular surface 102 includes orifice 108 for receiving fastener 202 for fixing the shipping strap to hybrid module housing 204, or for receiving dowel pin 206 for radially positioning the shipping strap relative to the hybrid module housing, as described in more detail below.

Annular surface 104 is radially inside of annular surface 102 and axially offset from annular surface 102. Annular surface 104 includes orifice 110 for receiving fastener 208 for securing the shipping strap to rotor 210 for electric machine 212 to axially position the rotor in the hybrid module housing. The central bore is arranged for receiving pilot 214 of the rotor for radially positioning the rotor in the hybrid module housing. Shipping strap 100 includes through bore 112 aligned with the central bore and lifting element 114 installed in the through bore for installing the hybrid module in a multi-speed transmission, as described in more detail below. The lifting element may be installed in the through bore by threaded connection 115, or by welding, epoxy, shrink fit, or any other method known in the art.

Hybrid module 200 includes shipping strap 100 and hybrid module housing 204. Fastener 202 is a bolt, for example, and the shipping strap is fixed to the hybrid module housing by the bolt installed in orifice 108 and threaded into the hybrid module housing. The shipping strap is radially positioned relative to the hybrid module housing by dowel pin 206 installed in orifice 108. Shipping strap 100 includes orifice 116 in annular surface 102 for receiving dowel pin 206 for radially positioning the shipping strap relative to the hybrid module housing. In other words, the shipping strap is fixed to the hybrid module housing by the bolt installed in orifice 108 and threaded into the hybrid module housing, and the shipping strap is radially positioned relative to the hybrid module housing by the dowel pin installed in orifice 116.

Rotor 210 for electric machine 212 is axially positioned in the hybrid module housing and secured to the shipping strap by fastener 208. For example, fastener 208 is a stud fixed to the rotor and nut 215 is installed on the stud to secure the rotor to the shipping strap. Rotor pilot 214 is installed in the central bore to radially position the rotor in the hybrid module housing. Torque converter 216 is fixed to rotor 210. Shipping dome 300 is fixed to the hybrid module housing for radially and axially positioning the torque converter relative to the hybrid module housing.

Figure 4:
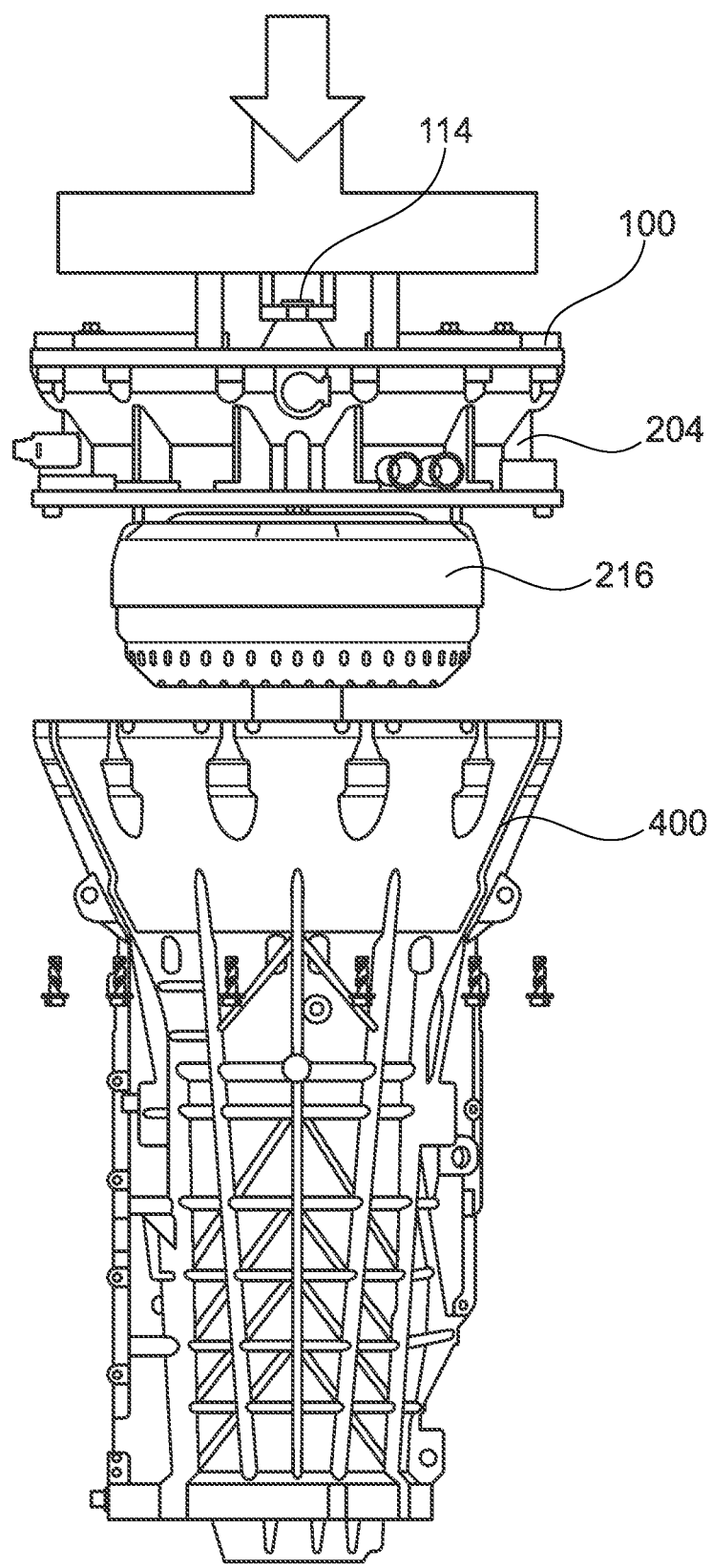
FIG. 4 is a top view of the hybrid module of FIG. 1 being assembled with a transmission.
Figure 5:
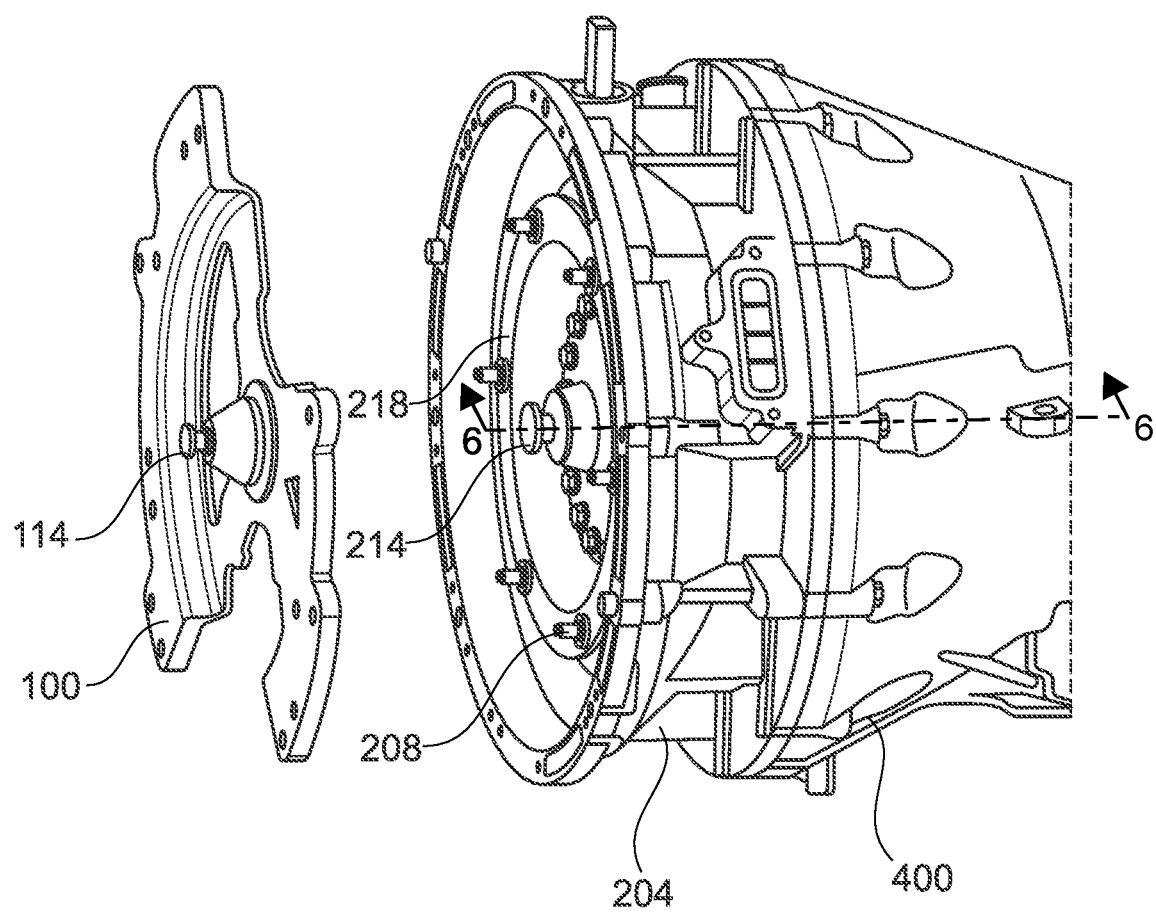
FIG. 5 is a partial exploded view of the hybrid module assembled to the transmission of FIG. 4 with the shipping strap removed.

The following disclosure is made with reference to FIGS. 1-5. FIG. 4 is a top view of the hybrid module of FIG. 1 being assembled with a transmission. FIG. 5 is a partial exploded view of the hybrid module assembled to the transmission of FIG. 4 with the shipping strap removed. The disclosure also provides a method of installing hybrid module 200 including providing hybrid module 200 with hybrid module 204 housing and rotor 210; providing shipping strap 100; securing the shipping strap to the hybrid module housing and to the rotor; transporting the hybrid module to a transmission assembly facility; installing the hybrid module with a transmission; transporting the transmission to a vehicle assembly facility; removing the shipping strap; and, installing the transmission in a vehicle.

The shipping strap includes lifting element 114 for aiding the step of installing the hybrid module with a transmission. The hybrid module includes torque converter 216. The method includes securing shipping dome 300 to the hybrid module housing before the step of transporting the hybrid module to a transmission assembly facility, and removing the shipping dome before the step of installing the hybrid module with a transmission.

Figure 6:
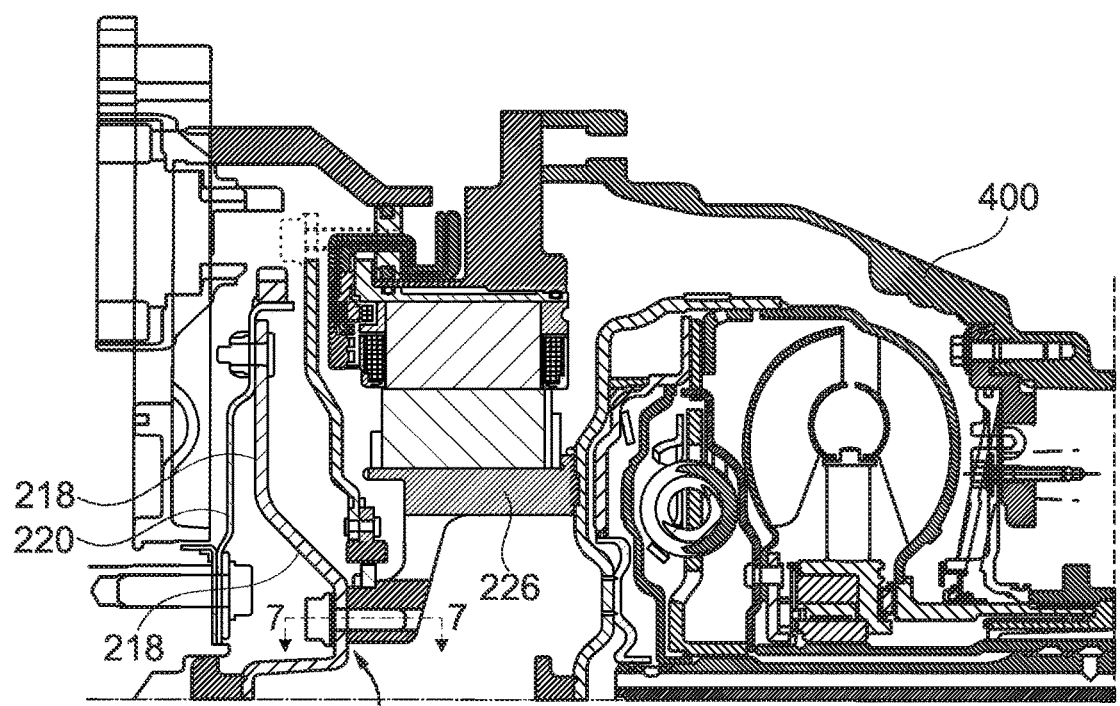
FIG. 6 is a top-half cross-sectional view of a hybrid module taken generally along line 6-6 in FIG. 5, shown installed between an engine and a transmission.
Figure 7:
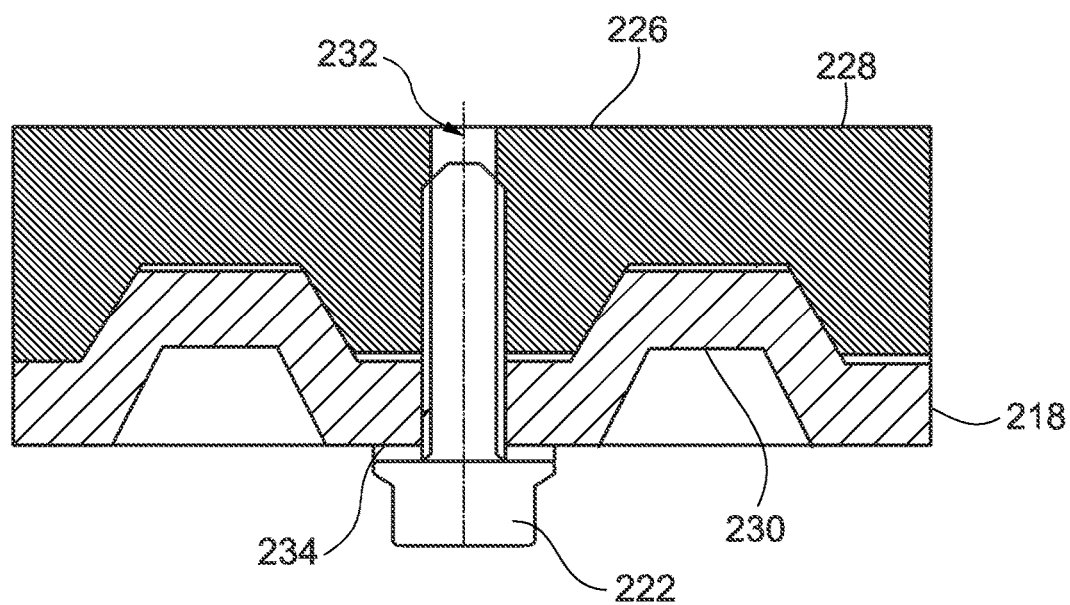
FIG. 7 is a section view taken generally along line 7-7 in FIG. 6.

The following description is made with reference to FIGS. 6-7. Hybrid module 200 includes housing 204, electric machine 212 installed in the housing and including rotor 210, drive plate 218 for fixing to engine flexplate 220, and fastener 222. The drive plate is fixed to the rotor by face spline connection 224 secured by the fastener. Rotor 210 includes rotor carrier 226 with face spline 228, and drive plate 218 includes face spline 230, complementary to and in contract with face spline 228. Face spline 228 and face spline 230 include respective apertures 232 and 234, and the fastener is installed in the apertures to axially retain the drive plate to the rotor carrier.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Shipping strap
102 Annular surface (first)
104 Annular surface (second)
106 Central bore
108 Orifice (first)
110 Orifice (second)
112 Through bore
114 Lifting element
115 Threaded connection
116 Orifice (third)
200 Hybrid module
202 Fastener (first)
204 Hybrid module housing
206 Dowel pin
208 Fastener (second)
210 Rotor
212 Electric machine
214 Pilot
215 Nut
216 Torque converter
218 Drive plate
220 Flexplate
222 Fastener
224 Face spline connection
226 Rotor carrier
228 Face spline (first)
230 Face spline (second)
232 Aperture (spline 228)
234 Aperture (spline 230)
300 Shipping dome
400 Transmission

What is claimed is:

1. A shipping strap for a hybrid module, comprising:
a first partially annular surface including a first orifice for:
receiving a first fastener for fixing the shipping strap to a hybrid module housing; or,
receiving a dowel pin for radially positioning the shipping strap relative to the hybrid module housing;
a second partially annular surface, radially inside of the first partially annular surface and axially offset from the first partially annular surface, comprising a second orifice for receiving a second fastener for securing the shipping strap to a rotor for an electric machine to axially position the rotor in the hybrid module housing;
a central bore arranged for receiving a pilot of the rotor for radially positioning the rotor in the hybrid module housing;
a through bore aligned with the central bore; and,
a lifting element installed in the through bore for installing the hybrid module in a multi-speed transmission.

2. The shipping strap of claim 1 wherein the lifting element is installed in the through bore by a threaded connection.

3. A hybrid module comprising:
the shipping strap of claim 1; and,
the hybrid module housing, wherein the first fastener is a bolt and the shipping strap is fixed to the hybrid module housing by the bolt installed in the first orifice and threaded into the hybrid module housing.

4. A hybrid module comprising:
the shipping strap of claim 1; and,
the hybrid module housing, wherein the shipping strap is radially positioned relative to the hybrid module housing by the dowel pin installed in the first orifice.

5. The shipping strap of claim 1 wherein:
the first orifice is for receiving the first fastener for fixing the shipping strap to the hybrid module housing; and
the first partially annular surface comprises a third orifice for receiving the dowel pin for radially positioning the shipping strap relative to the hybrid module housing.

6. A hybrid module comprising:
the shipping strap of claim 5; and,
the hybrid module housing; wherein:
the first fastener is a bolt;
the shipping strap is fixed to the hybrid module housing by the bolt installed in the first orifice and threaded into the hybrid module housing; and,
the shipping strap is radially positioned relative to the hybrid module housing by the dowel pin installed in the third orifice.

7. A hybrid module comprising:
the shipping strap of claim 5; and,
the hybrid module housing; wherein:
the first fastener is a bolt;
the shipping strap is fixed to the hybrid module housing by the bolt installed in the first orifice and threaded into the hybrid module housing; and,
the shipping strap is radially positioned relative to the hybrid module housing by the dowel pin installed in the third orifice.

8. A hybrid module comprising:
the shipping strap of claim 1;
the hybrid module housing;
the second fastener; and,
the rotor for the electric machine axially positioned in the hybrid module housing and secured to the shipping strap by the second fastener.

9. The hybrid module of claim 8 further comprising a nut, wherein:
the second fastener is a stud fixed to the rotor; and,
the nut is installed on the stud to secure the rotor to the shipping strap.

10. A hybrid module comprising:
the shipping strap of claim 1;
the hybrid module housing; and,
the rotor for the electric machine comprising the pilot installed in the central bore to radially position the rotor in the hybrid module housing.

11. A hybrid module comprising:
a hybrid module housing;
a rotor for an electric machine, comprising a pilot; and,
a shipping strap comprising:
    a first partially annular surface comprising a first orifice and a third orifice;
    a second partially annular surface, radially inside of the first partially annular surface and axially offset from the first partially annular surface, comprising a second orifice; and,
    a central bore; wherein:
        the shipping strap is secured to the hybrid module by a first fastener installed in the first orifice;
        the shipping strap is secured to the rotor by a second fastener installed in the second orifice;
        the shipping strap is radially positioned relative to the hybrid module housing by a dowel pin installed in the third orifice; and,
        the rotor is radially positioned in the hybrid module housing by the pilot installed in the central bore.

12. The hybrid module of claim 11 wherein the rotor is axially positioned in the hybrid module housing by the shipping strap.

13. The hybrid module of claim 11 further comprising:
a torque converter fixed to the rotor; and,
a shipping dome fixed to the hybrid module housing for radially and axially positioning the torque converter relative to the hybrid module housing.

14. A shipping strap for a hybrid module, comprising:
a first partially annular surface comprising:
    a first orifice for receiving a first fastener for fixing the shipping strap to a hybrid module housing; and
    a third orifice for receiving a dowel pin for radially positioning the shipping strap relative to the hybrid module housing;
a second partially annular surface, radially inside of the first partially annular surface and axially offset from the first partially annular surface, comprising a second orifice for receiving a second fastener for securing the shipping strap to a rotor for an electric machine to axially position the rotor in the hybrid module housing; and
a central bore arranged for receiving a pilot of the rotor for radially positioning the rotor in the hybrid module housing.

\* \* \* \* \*